United States Patent [19]

Hauser

[11] 4,345,641
[45] Aug. 24, 1982

[54] MOTOR VEHICLE, ESPECIALLY A TRUCK, WITH A COOLING DEVICE FOR AN INTERNAL COMBUSTION ENGINE

[75] Inventor: Kurt Hauser, Stuttgart, Fed. Rep. of Germany

[73] Assignee: Suddeutsche Kuhlerfabrik Julius Fr. Behr GmbH & Co. KG, Stuttgart, Fed. Rep. of Germany

[21] Appl. No.: 195,857

[22] Filed: Oct. 10, 1980

[30] Foreign Application Priority Data

Oct. 10, 1979 [DE] Fed. Rep. of Germany ....... 2941014

[51] Int. Cl.³ ............................................. F28F 9/00
[52] U.S. Cl. ...................................... 165/41; 62/244; 123/41.48; 165/70; 165/134 R; 180/68 P
[58] Field of Search .......................... 123/41.48, 41.49; 165/41, 44, 51, 70, 134 R; 180/54 A, 68 R, 68 P; 62/244

[56] References Cited

U.S. PATENT DOCUMENTS

| 1,865,536 | 7/1932 | Modine .................................. 165/70 |
| 2,918,805 | 12/1959 | Schjolin ............................ 62/243 X |
| 3,420,294 | 1/1969 | Kirkpatrick ........................... 165/41 |
| 3,715,001 | 2/1973 | Wilson .............................. 180/68 R |
| 3,774,710 | 11/1973 | Gustavsson .................. 123/41.51 X |
| 3,929,202 | 12/1975 | Hobbensiefken ................. 180/68 R |
| 3,999,599 | 12/1976 | Zuege ............................... 62/244 X |

Primary Examiner—Sheldon J. Richter
Attorney, Agent, or Firm—Craig and Antonelli

[57] ABSTRACT

A motor vehicle, especially a truck, with a cooling device for an internal combustion engine is disclosed. The cooling device comprises at least one heat exchanger which is mounted in an elevated position on top of or behind a cab of the vehicle. A liquid-collecting container is located at least beneath the heat exchanger of the cooling device to protect the vehicle occupants against scalding in the event the heat exchanger is damaged as in an accident.

14 Claims, 7 Drawing Figures

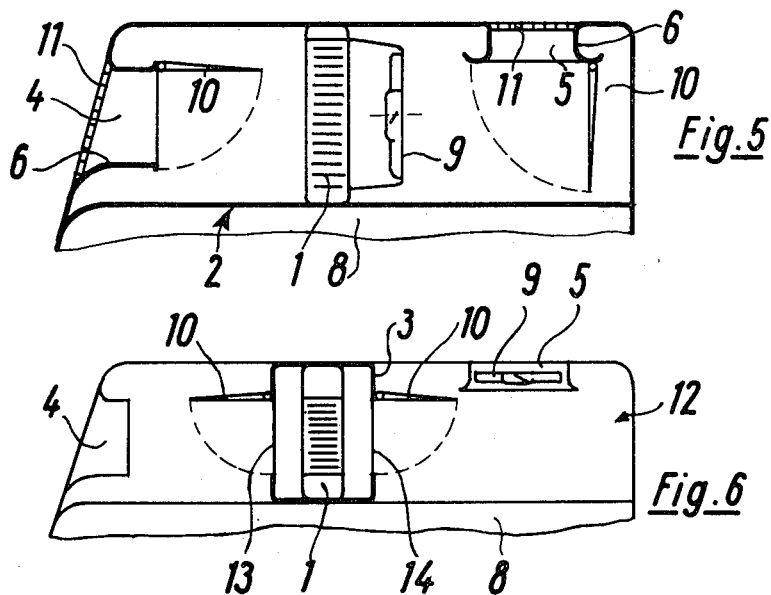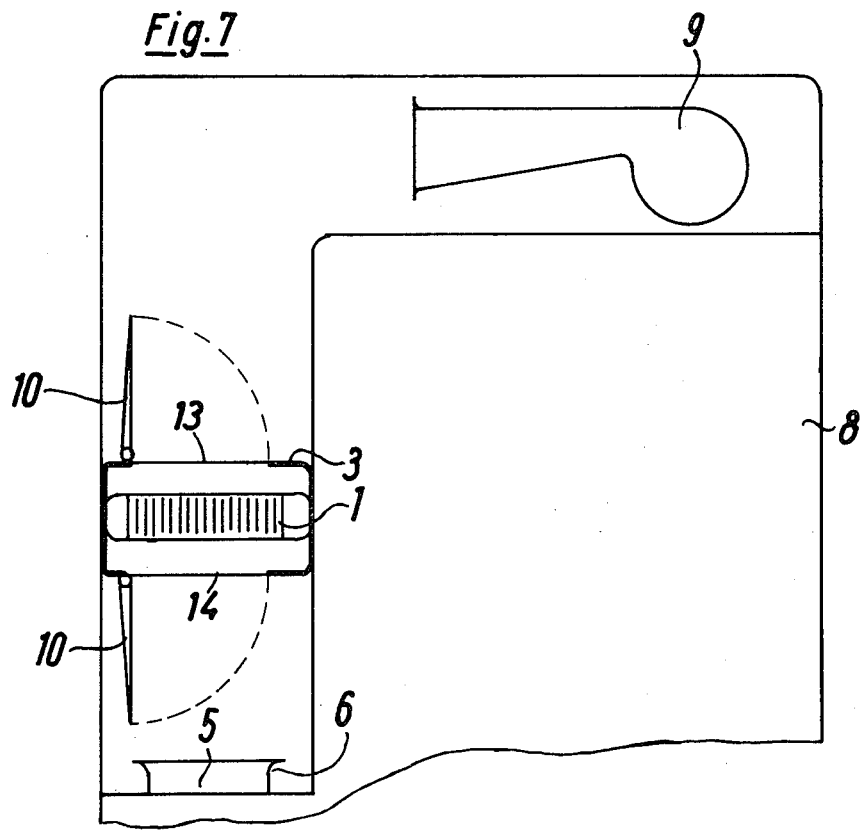

MOTOR VEHICLE, ESPECIALLY A TRUCK, WITH A COOLING DEVICE FOR AN INTERNAL COMBUSTION ENGINE

BACKGROUND AND SUMMARY OF THE INVENTION

The present invention relates to a motor vehicle, especially a truck, with a cooling device for an internal combustion engine, said cooling device comprising at least one heat exchanger, said heat exchanger being mounted elevated on or behind a cab.

Mounting the heat exchanger of a cooling device of a truck on the roof of the cab and surrounding it with a housing-like shroud is known (German Offenlegungsschriften Nos. 2,747,785, 2,424,929, United Kingdom Pat. No. 1,338,300). Air intakes and exhausts are provided in the area above the windshield and also in the area above the side windows (German Offenlegungsschrift No. 2,424,929). Such arrangements encounter considerable opposition in practice owing to the considerably increased danger of scalding to which the driver or a passenger is exposed, since the coolant, usually water, escaping from a defective heat exchanger, can penetrate the interior of the cab very rapidly, especially if the windows are open. This danger of scalding exists particularly in accidents wherein the heat exchanger is damaged by said accident.

An object of the present invention is to provide a motor vehicle of the type described hereinabove in such fashion that the level of protection of the vehicle occupants against scalding by a defective heat exchanger in the cooling device is increased. This object is attained according to the present invention in that a liquid-collecting container is disposed at least beneath the heat exchanger.

The present invention thus prevents the hot coolant from running out in an uncontrolled fashion if the heat exchanger is defective, and prevents the coolant from possibly entering the vehicle interior. Instead, provision is made for collecting and catching the coolant, which escapes as a result of a defect, in a predetermined area.

In a preferred embodiment of the present invention, the heat exchanger is mounted in the liquid-collecting container which is a closed container except for one or more air intake openings and air exhaust openings, the container being resistant to pressure and breakage. The edges of the air intake openings and air exhaust openings are located at a distance from the bottom and side walls of the container. In this embodiment, the container which holds the heat exchanger, by virtue of the arrangement of intake and exhaust openings, serves as a collecting tank for the coolant which escapes from the heat exchanger, both during normal operation and in the event of the container being turned on its side as the result of an accident.

According to a further feature of the present invention, the edges of the air intake opening or openings and the air exhaust opening or openings in the liquid-collecting container have extensions pointing toward the interior of the container. These nozzle-shaped fittings, on the one hand, improve the guidance of the cooling air flow and, on the other hand, reliably ensure, especially in the case of the vehicle being turned on its side or upside down as the result of an accident, that no coolant can escape.

Another feature of the present invention involves the provision of a lining of absorbent material for the interior walls of the container. This measure prevents coolant from escaping in the event that both the heat exchanger and the container within it are defective. The container lining is also especially advantageous when a cooling blower is located inside the container along with the heat exchanger, since this lining suppresses the noise produced by the blower, if a sound-absorbent material is used for the lining.

In another embodiment of the present invention, the air intake opening or openings and the air exhaust opening or openings of the liquid-collecting container are provided with sealing elements. This measure provides protection against escaping coolant even in the event that the container is not made sufficiently large to capture all of the escaping coolant. It is especially advantageous for the sealing elements to be linked to position-dependent and/or pressure-dependent switching elements.

These switching elements, so-called position sensors or pressure sensors, respond to excessive lengthwise or crosswise inclination or excessive force upon or deformation of the vehicle, and trigger the closing of the sealing elements.

In another embodiment of the present invention, valves are provided in the coolant supply and return lines leading to or from the heat exchanger, said valves likewise being provided with position-dependent and/or pressure-dependent switching elements. These switching elements ensure that the supply of coolant to the heat exchanger will be interrupted in the event of excessive longitudinal or transverse inclination or excessive loading of the vehicle, so that if the heat exchanger becomes defective, only the volume of coolant contained in the heat exchanger and the lines to the valves can escape. This also permits reducing the size of the collecting chamber and/or further increasing the safety of the vehicle occupants.

These and other objects, features and advantages of the present invention will become more obvious from the following description when taken in connection with the accompanying drawings which show, for purposes of illustration only, several embodiments in accordance with the present invention; and wherein:

FIG. 5 is a lengthwise cross-sectional view through the roof area of a cab of a truck according to another embodiment of the present invention;

FIG. 6 is a lengthwise cross-sectional view similar to FIG. 5 of a still further embodiment of the invention with a pressure-resistant container located only in the immediate vicinity of a heat exchanger; and FIG. 7 is a schematic cross-sectional view through a truck according to the present invention, the cross-section being taken transversely to the direction of travel, in the area behind a cab.

DETAILED DESCRIPTION OF THE DRAWINGS

Figure 1:
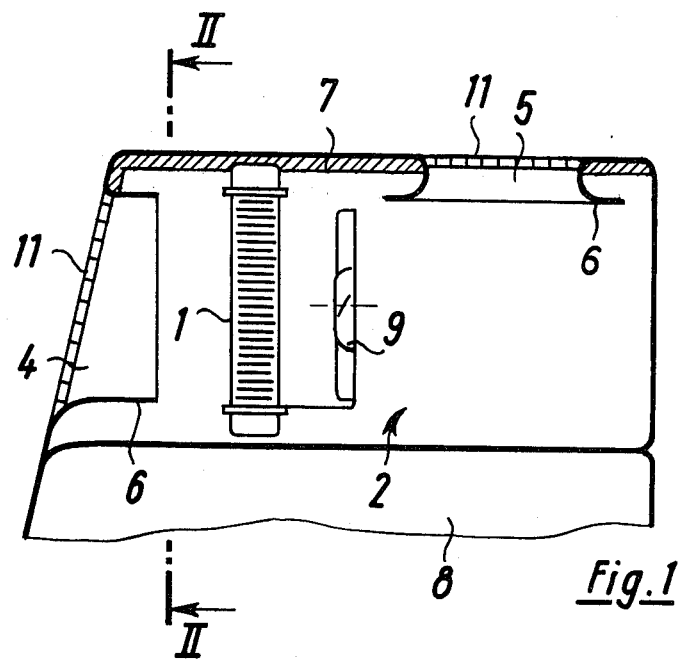
FIG. 1 is a lengthwise cross-sectional view through a vehicle according to one embodiment of the present invention, and particularly, through the roof area of a cab of a truck.

In the embodiment shown in FIG. 1, a channel-shaped container 2 or a housing is located above the roof of a cab 8, said container of the housing extending over the complete length and width of the roof of the cab 8. However, especially in the case of tilt cabs, it may be more advantageous for weight reasons for the container or housing to be made smaller. This container 2 is made of a strong material, for example, thick-walled sheet metal, and possibly provided with reinforcements, so that a pressure- and breakage-resistant container 2 is produced. Container 2 has an air intake opening 4 in its front wall, above the windshield (not shown) of cab 8, and an air exhaust opening 5 in its cover. Both air inlet opening 4 and air outlet opening 5 are screened by a grating 11.

A heat exchanger is located inside container 2, said exchanger being located transversely to the direction of travel and transversely to air intake opening 4, said heat exchanger being connected in a manner not shown in greater detail with the supply and return lines to the internal combustion engine of the truck, said heat exchanger being traversed by the engine coolant, especially water. Heat exchanger 1 forms a structural unit with a fan 9, which, in the embodiment shown, is designed as an axial-flow fan located in the flow path of the air behind heat exchanger 1. The walls of the container are provided with a lining 7 made of absorbent material, which in FIG. 1 is shown only in the vicinity of the cover of container 2. Air intake opening 4 and air exhaust opening 5 are each provided with nozzle-shaped edges 6, directed inward into the container.

Container 2 is designed to be liquid-tight except for air intake opening 4 and air exhaust opening 5. When the roof of cab 8 is used as the bottom of container 2, a sealing gasket is advantageously placed between the roof and the edges of container 2. The area of the junction can also be sealed off if desired by using a liquid, curing sealant. Air intake opening 4 is disposed (FIG. 2) in such fashion that it is located at a distance both from the bottom of container 2 and the side walls and cover. Air exhaust opening 5 is located in similar fashion in the cover. In this manner, and in conjunction with the nozzle-shaped extensions, it is ensured that container 2 serves as a collecting container for coolant that escapes from heat exchanger 1 in the event of a defect, whereby container 2 is so designed as a result of the arrangement of air intake opening 4 and air intake opening 5 and the inwardly directed nozzle-shaped edges adjacent thereto, that it can serve as a collecting chamber for escaping coolant in any position, i.e., the normal position shown, a position with the vehicle on its side, or with the vehicle upside down. Lining 7 is made of an absorbent material, further increasing protection against the escape of coolant from container 2, since any escaping coolant will be absorbed by the absorbent material. No coolant can escape in large amounts even if heat exchanger 1 and container 2 are rendered defective in an accident.

Figure 3:
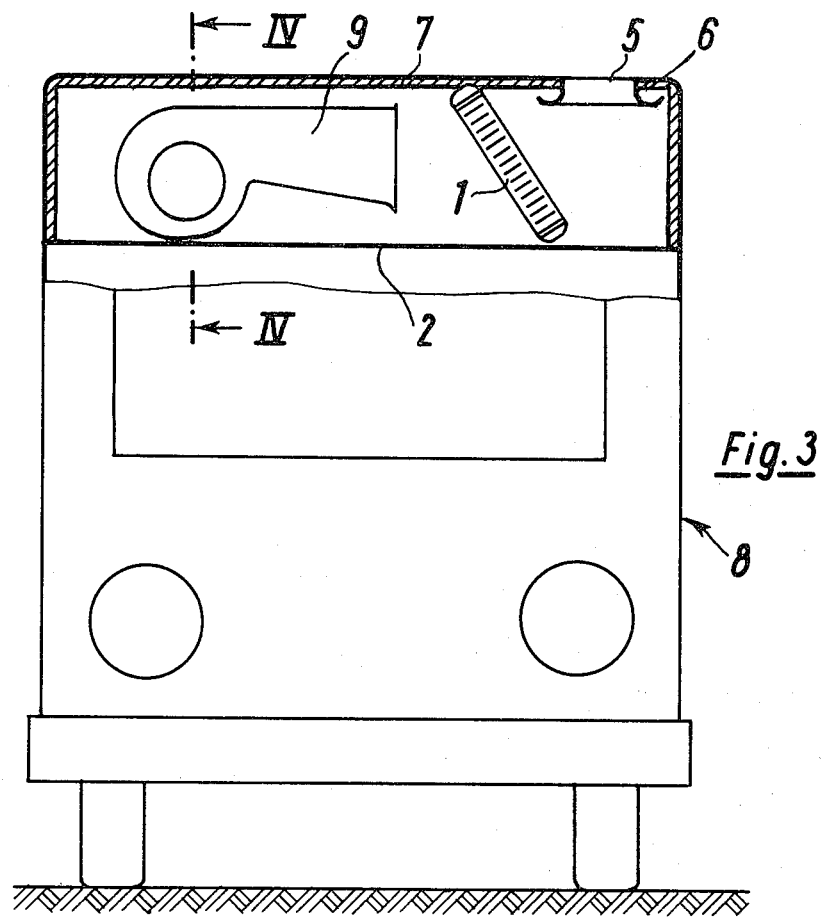
FIG. 3 is a partially cut-away front view of a truck according to a second embodiment of the invention.
Figure 4:
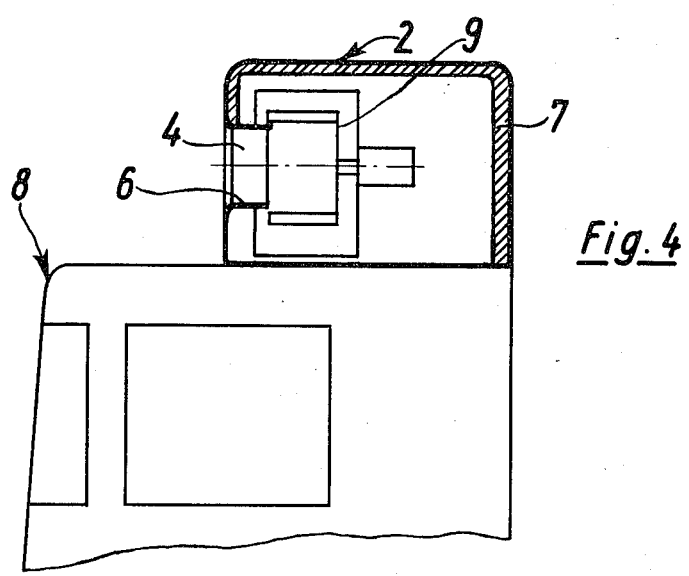
FIG. 4 is a section along line IV—IV through the upper part of the cab of the truck shown in FIG. 3.

The embodiment shown in FIGS. 3 and 4 is designed according to the same principle, as the embodiment in FIG. 1. In the latter embodiment, however, the container, designed to be resistant to pressure and breakage, is limited essentially to the rearward area of the roof of cab 8. However, as in the embodiment shown in FIG. 1, it occupies the entire width of cab 8. In this embodiment, a radial fan with a spiral housing directly abuts air intake opening 4, said opening likewise being provided with a nozzle-shaped inwardly directed edge, a heat exchanger 1, inclined at 45°, being attached to the outlet of said spiral housing, said heat exchanger extending lengthwise with respect to the vehicle. An air exhaust opening 5 is located downstream of this heat exchanger 1 in the cover of container 2, said opening likewise being provided with an inwardly directed edge 6. In this embodiment as well, container 2 is provided with a lining 7 made of absorbent material. Likewise, in this embodiment the arrangement and design of air intake opening 4 and air exhaust opening 5 as well as a complete sealing of container 2 in the remaining areas provides a high degree of protection against the escape of coolant.

Figure 2:
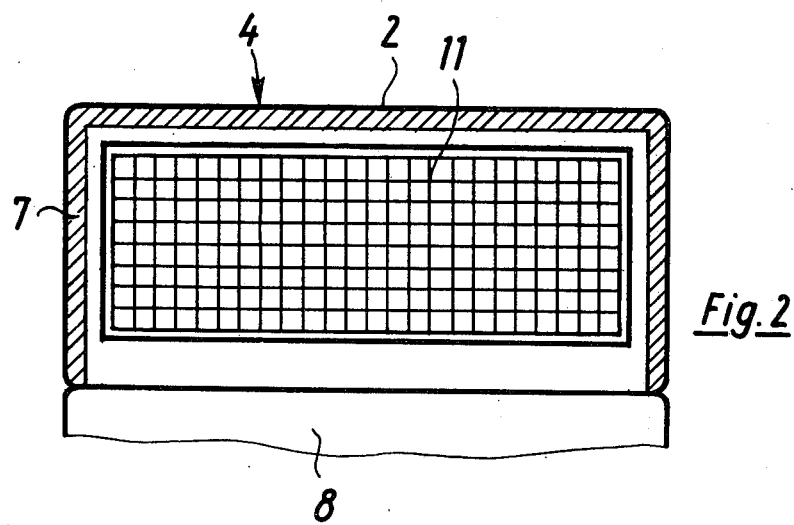
FIG. 2 is a cross-sectional view of the vehicle of FIG. 1, taken along the line II—II.

The embodiment shown in FIG. 5 corresponds to the embodiment in FIGS. 1 and 2. In addition, sealing elements are provided for air intake opening 4 and air exhaust opening 5, said elements made in the form of sealing valves 10, articulated unilaterally to edge 6 and sealable internally upstream of openings 4 and 5 delimited by edges 6. They are so-called rapid-sealing elements. Advantageously, provision is made for controlling sealing valves 10 by position sensors, not shown, which respond to excessive lengthwise and sidewise tilting of the vehicle, characteristic of an accident. By using sealing valves 10, the volumes of the collecting chambers or spaces which surround air intake 4 and air exhaust 5 may be decreased. Instead of increasing, or even for further increasing, protection in conjunction with position sensors, pressure sensors can also be used which respond to a force or a deformation, and therefore serve as a criterion for the occurrence of an accident. These pressure sensors are then advantageously mounted in the housing or container in order to respond to the latters' being subjected to excessive loading or deformation.

In the embodiment shown in FIG. 6, the heat exchanger is located in a channel-shaped housing 12, which has the shape of the container shown in FIGS. 1, 2, and 5, but need not possess its resistance to pressure and breakage. In this embodiment, axial fan 9 is located in air exhaust opening 5. The heat exchanger is located within a pressure- and breakage-resistant container 3 which encloses it alone, said container 3 being provided with an air intake opening 13 in the flow direction upstream of the heat exchanger and with an air exhaust opening 14 downstream of the heat exchanger. Depending on the size of container 3, which is sealed off except for openings 13 and 14, the ability to collect coolant is limited. In order reliably to prevent the escape of coolant, sealing elements in the form of sealing valves 10 are provided for air intake opening 13 and air exhaust opening 14 of container 3. These sealing valves 10 can advantageously be closed in the same manner as sealing valves 10 of the embodiment according to FIG. 5, by means of position sensors or pressure sensors.

The principle which serves as the basis of the embodiment shown in FIG. 6, namely limiting the container, sealed except for air intake opening 13 and air exhaust opening 14, essentially to the area of heat exchanger 1 may advantageously be used in practice for any form of an arrangement of a heat exchanger of a cooling device for the internal combustion engine of a vehicle and especially a truck. This is shown in particular in the embodiment according to FIG. 7, wherein heat exchanger 1 is disposed laterally behind a cab 8 of a truck.

The cooling air is supplied to this heat exchanger 1 through a radial fan 9, said fan being mounted above the cab as shown in the embodiment in FIGS. 3 to 4, and has an air intake opening which is not shown but is open in the direction of travel. The cooling air is then guided transversely to the roof of the cab and laterally, and thence downward to heat exchanger 1, which is preferably located in a depression in the rear wall of cab 8. A downwardly directed air outlet opening 5 is located behind heat exchanger 1. In this embodiment as well, heat exchanger 1 is located in a container 3, resistant to pressure and breakage, limited essentially to its area, said container being sealed except for air intake opening 13 and air exhaust opening 14. Air intake opening 13 and air exhaust opening 14 are provided with sealing valves 10 which are likewise controlled by sensors.

In all of the embodiments in which sealing valves 10 and rapid sealing valves are used, it is advantageous to provide additional monitoring and control elements for the sealing valves 10 and rapid-sealing valves, so that the function and especially the position of the valves can be checked. The valves 10 or rapid-sealing valves may be actuated electrically, pneumatically, or hydraulically, whereby the control signal is triggered by the appropriate position and/or pressure sensors in the event of an accident. The additional display and control elements which bypass the position and/or pressure sensors are advantageously designed in the form of switches or pushbuttons which are advantageously located in the cab.

While I have shown and described several embodiments in accordance with the present invention, it is understood that the same is not limited thereto but is susceptible to numerous changes and modifications as known to those skilled in the art and I therefore do not wish to be limited to the details shown and described herein but intend to cover all such changes and modifications as are encompassed by the scope of the appended claims.

I claim:

1. A motor vehicle with a cooling device for an internal combustion engine, said cooling device comprising at least one heat exchanger, said heat exchanger being mounted in an elevated position on top of or behind a cab of the vehicle, the improvement comprising a liquid-collecting container means which is provided about said heat exchanger, said liquid-collecting container means being resistant to pressure and breakage, being closed except for one or more air intake openings and air exhaust openings, and being provided at said air intake and exhaust openings with means for ensuring that said container means serves as a liquid-collecting chamber for coolant that escapes from the heat exchanger in any position of the vehicle.

2. A motor vehicle according to claim 1, wherein the edges of said air intake openings and air exhaust openings in said container means are located at a distance at least from the bottom and side walls of said container means.

3. A motor vehicle according to claim 2 or 1, wherein said means for ensuring that the container means serves as a liquid-collecting chamber for coolant in any position of the vehicle includes nozzle-shaped fittings provided at the edges of air intake openings and the air exhaust openings, the nozzle-shaped fittings being directed inward into the container means.

4. A motor vehicle according to claim 3, wherein the inside walls of said container means are lined with absorbent material.

5. A motor vehicle according to claim 3, wherein said means for ensuring that said container means serves as a liquid-collecting chamber in any position of the vehicle further includes sealing elements provided at the air intake opening or openings and the air exhaust opening or openings of the container means.

6. A motor vehicle according to claim 5, wherein the sealing elements are connected with position-dependent and/or pressure-dependent switching elements.

7. A motor vehicle according to claim 5, wherein monitoring and control elements are connected with said sealing elements.

8. A motor vehicle according to claim 2 or 1, wherein the inside walls of said container means are lined with absorbent material.

9. A motor vehicle according to claim 2 or 1, wherein said means for ensuring that said container means serves as a liquid-collecting chamber in any position of the vehicle includes sealing elements provided at the air intake opening or openings and the air exhaust opening or openings of the container means.

10. A motor vehicle according to claim 9, wherein the sealing elements are connected with position-dependent and/or pressure-dependent switching elements.

11. A motor vehicle according to claim 10, wherein monitoring and control elements are connected with said sealing elements.

12. A motor vehicle according to claim 1, wherein valves are located in coolant supply and return lines running to and from said heat exchanger, said valves being connected to position-dependent and/or pressure-dependent switching elements.

13. A motor vehicle according to claim 12, wherein monitoring and control elements are connected with said valves.

14. A motor vehicle according to claim 12, wherein said valves are located at the coolant inlet and outlet of the internal combustion engine.

* * * * *